US011307704B1

(12) United States Patent
Pelissier et al.

(10) Patent No.: US 11,307,704 B1
(45) Date of Patent: Apr. 19, 2022

(54) SYSTEMS AND METHODS FOR RESOLVING TOUCH AND PEN CONFLICTS BETWEEN MULTIPLE TOUCH CONTROLLERS COUPLED TO A COMMON TOUCHSCREEN DISPLAY

(71) Applicant: DELL PRODUCTS L.P., Round Rock, TX (US)

(72) Inventors: Gerald R. Pelissier, Mendham, NJ (US); Hsufeng Lee, Taipei (TW); Yagiz C. Yildiz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/150,423

(22) Filed: Jan. 15, 2021

(51) Int. Cl.
*G06F 3/041* (2006.01)
*G06F 3/0488* (2013.01)
*G06F 3/04883* (2022.01)

(52) U.S. Cl.
CPC ........ *G06F 3/04162* (2019.05); *G06F 3/0412* (2013.01); *G06F 3/04883* (2013.01)

(58) Field of Classification Search
CPC . G06F 3/04162; G06F 3/04883; G06F 3/0412
See application file for complete search history.

(56) References Cited

U.S. PATENT DOCUMENTS

| | | | |
|---|---|---|---|
| 10,216,304 B2 | 2/2019 | Huang | |
| 10,276,081 B2 | 4/2019 | Ong et al. | |
| 10,656,761 B2 | 5/2020 | Chen et al. | |
| 2011/0260997 A1* | 10/2011 | Ozaki | G06F 1/1643 |
| | | | 345/173 |
| 2012/0081289 A1* | 4/2012 | Sirpal | G06F 3/04845 |
| | | | 345/168 |
| 2013/0021262 A1* | 1/2013 | Chen | G06F 3/0488 |
| | | | 345/173 |
| 2017/0083143 A1* | 3/2017 | Jeong | G06F 3/03545 |
| 2018/0314376 A1 | 11/2018 | Chen et al. | |
| 2019/0227657 A1* | 7/2019 | Shimizu | G06F 3/04166 |
| 2020/0401263 A1* | 12/2020 | Chung | G06F 3/0416 |

OTHER PUBLICATIONS

Guerrero et al., "Systems And Methods For Implementing A Dynamic And Contextual On Screen Keyboard", U.S. Appl. No. 16/833,634, filed Mar. 29, 2020, DELL:280, 51 pgs.

* cited by examiner

*Primary Examiner* — Ryan A Lubit
(74) *Attorney, Agent, or Firm* — Egan, Enders & Huston LLP.

(57) ABSTRACT

Systems and methods are provided that may be implemented to share digital touch data (e.g., user finger touch data, pen or stylus touch data, etc.) between two or more touch controllers that are coupled to separate respective touch-sensing segments of a common touchscreen display device. The shared digital touch data may correspond to (and be derived from) analog user touch signals received within a defined margin area of each touch-sensing layer segment that lies adjacent to a middle boundary region of the touchscreen display. Each touch controller may accurately determine or compute the user touch intent for a touch data map of its corresponding touch-sensing layer segment after resolving any existing boundary conflict between digital touch data that corresponds to adjacent touch sensor segments. An operating system (OS) executing on a host programmable integrated circuit may then reconstruct and provide the full touch data map for the entire touchscreen display device.

21 Claims, 12 Drawing Sheets

FIG. 1 – Prior Art

| | Book 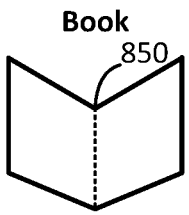 | Mobile in One: Landscape 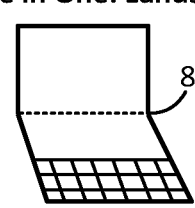 |
|---|---|---|
| Picture | | |
| User Mode | Book Mode | Traditional Notebook Mode |
| Sharing Area | 5mm | 0mm |
| Remark | Potential user notetaking across the physical sensor boundary | No application across the physical sensor boundary |
| Picture | Canvas 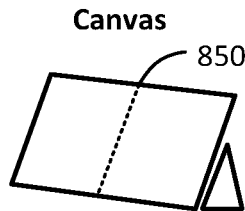 | Mobile in One: Portrait 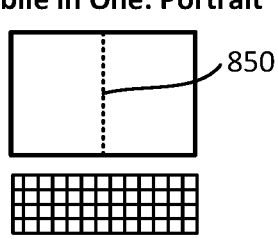 |
| User Mode | Tablet Mode: Landscape | Notebook with external KB |
| Sharing Area | 10mm | 5mm |
| Remark | Potential Palm rejection during Pen writing | Potential INKing discontinue issue across the physical sensor boundary |

*FIG. 8*

SYSTEMS AND METHODS FOR RESOLVING TOUCH AND PEN CONFLICTS BETWEEN MULTIPLE TOUCH CONTROLLERS COUPLED TO A COMMON TOUCHSCREEN DISPLAY

FIELD

This invention relates generally to information handling systems and, more particularly, to supporting a common touchscreen display with multiple touch controllers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include a touchscreen display which both displays images and receives finger and pen touch input from a user via a touch controller, and there are many different sizes of touchscreen displays that require touch controllers with different capabilities. In many cases, different touch controller integrated circuits are created for different sizes of touchscreen displays. Attempting to match different touchscreen controllers with different respective sizes of touchscreen displays increases complexity and cost across the entire supply chain, especially for large form factor touchscreen displays (17 inch diagonal or larger size screens) that have a much lower Total Addressable Market (TAM).

Many readily available industry standard touch controllers do not have a sufficient number of receive (RX) and transmit (TX) lines to support larger touchscreen displays (such as foldable touchscreens) that have a pitch that is less than or equal to 5 millimeters combined with a diagonal dimension that is greater than 17 inches as measured across the touchscreen. Therefore, larger touchscreen displays typically employ a segmented touch sensor area, and separate touch controllers are typically coupled to receive analog touch signals (transmit (TX) and receive (RX) signals) provided by the separate touch sensor segments of the larger touchscreen display. However, touch performance issues can potentially arise across the border between two separate touch sensor segments of a common touchscreen display due to conflicts between their respective touch controllers. Examples of such touch performance issues include ghost finger (i.e., where the position of finger is recorded in slightly different positions, such as two millimeters apart, by different touch controllers), touch/pen linearity, poor touch sensitivity and palm rejection error (i.e., where a small portion of a palm touch to one sensor segment is interpreted by its touch controller as a finger touch).

It is known to resolve touch and pen performance issues between two separate touch controllers of a single touchscreen by transferring the entire sensor segment heat map from each of the touch controllers to the operating system (OS) executed by a central processing unit (CPU) of an information handling system, which then resolves any conflict between the multiple touch controllers. However, such a solution is dependent on, and specific to, the particular OS employed by the host programmable integrated circuit of each given information handling system. Moreover, using the OS to resolve touch controller conflicts requires increased bandwidth and OS processing due to the transfer of the entire heat map data from each touch controller to the CPU.

It is also known to resolve touch and pen conflicts between multiple controllers of a single touchscreen using a master/slave relationship between a single "master" touch controller and one or more other "slave" touch controllers. However, implementing multiple touch controllers in a master/slave relationship increases complexity and processing delays, which only increases as the number of touch controllers increases.

FIG. 1 illustrates another known architecture 100 for implementing dual touch controllers 104a and 104b for a common touchscreen 102, with an analog front end (AFE) 103a of a first touch controller 104a coupled by hardwire conductors to transmit drive signals 105a (TX signals) to a TX lines of a first sensor segment 108a of touchscreen 102 and to receive analog touch signals 106a (RX signals) from RX lines of the first sensor segment 108a, and an AFE 103b of a second touch controller 104b is coupled by hardwire conductors to transmit drive signals 105b (TX signals) to TX lines of a separate second sensor segment 108b of touchscreen 102 and to receive analog touch signals 106b (RX signals) from RX lines of the second sensor segment 108b as shown. First touch controller 104a and second touch controller 104b are also coupled to provide heat map data to a central processing unit (CPU) as shown. In the conventional configuration of FIG. 1, AFE 103a of first touch controller 104a is also coupled by additional hardwire conductors 114a to directly transmit drive signals and receive analog touch signals from respective TX lines and RX lines of an inner boundary area 110b of second sensor segment 108b, and second touch controller 104b is also coupled by additional hardwire conductors 114b to directly transmit drive signals and receive analog touch signals from respective TX lines and RX lines of an inner boundary region 110a of first sensor segment 108a. The width of each inner boundary area 110a and 110b is determined by the provided number of respective hardwire conductors 114a and 114b coupled to TX and RX lines of first and second sensor segments 108a and 108b, respectively.

In the conventional configuration of FIG. 1, touch controllers 104a and 104b share the analog touch signals provided directly across hardwire conductors 114a and 114b from respective inner boundary regions 110b and 110a of respective sensor segments 108b and 108a. Sharing the analog touch signals from boundary regions 110a and 110b allows respective microcontrollers 111a and 111b of touch controllers 104a and 104b to attempt to calculate the same touch values as each other for boundary regions 110a and 110*b*, so as to attempt to resolve touch conflicts and provide continuity across the border 120 between sensor segments 108*a* and 108*b* of the common touchscreen 102 when a finger or pen touch occurs across the physical boundary region 120 between sensor segments 108*a* and 108*b*. However, this conventional solution requires adding additional hardware conductors 114*a* and 114*b* to the circuitry of touchscreen 102 and touch controllers 104*a* and 104*b*, and the size of inner boundary regions 110*a* and 110*b* is permanently fixed by the number of additional hardwire conductors 114*a* and 114*b* that are provided during original fabrication of the circuitry for touch controllers 104*a* and 104*b* and touchscreen 102. Additionally, the additional hardwire conductors 114*a* and 114*b* are subject to analog noise interference which can cause deviations and discontinuity between the touch location values calculated by touch controllers 104*b* and 104*a* for respective boundary regions 110*a* and 110*b* from the hardwire conductors 114*a* and 114*b*.

SUMMARY

Disclosed herein are systems and methods for sharing digital touch data (e.g., user finger touch data, pen or stylus touch data, etc.) between two or more touch controllers that are coupled to separate respective touch-sensing layer segments of a common touchscreen display device that has an underlying unitary and continuous layered display screen or display panel (e.g., a single unitary and continuous display screen in one embodiment). In one embodiment, the shared digital touch data may correspond to (and be derived from) analog user touch signals received within a defined margin area of each touch-sensing layer segment that lies adjacent to a middle boundary region of the touchscreen display that is defined at the boundary between separate adjacent touch-sensing layer segments of the touchscreen display. In one embodiment, the digital touch data of the margin area may be shared by each touch controller with each other touch controller through an existing electrical interface, such as a Universal Asynchronous Receiver-Transmitter (UART) interface, Inter-Integrated Circuit (I²C) interface, Serial Peripheral Interface (SPI), etc. This sharing of margin area digital touch data enables a programmable integrated circuit of each touch controller to accurately determine or compute the user touch intent for a touch data map of its corresponding touch-sensing layer segment after resolving any existing boundary conflict between digital touch data that corresponds to adjacent touch sensor segments by virtue of the shared digital touch data. Each touch controller may then provide its fully-resolved touch data (e.g., including any finger and pen touch events) to a host programmable integrated circuit (e.g., central processing unit) of an information handling system. In such an embodiment, the host programmable integrated circuit may execute an operating system (OS) to reconstruct and provide the full touch data map for the entire touchscreen display device, e.g., to an application executing on the host programmable integrated circuit.

In one embodiment, an analog front end (AFE) of each given touch controller of a touchscreen display device may first receive analog touch signals from a given touch-sensing layer segment of the touchscreen display device, and an analog to digital converter (ADC) of the given AFE may convert the analog touch signals to digital touch data corresponding to the entire given touch-sensing layer segment. The given AFE may then be configured to select a portion of the digital touch data that corresponds to a defined margin area of the given touch-sensing layer segment, and to share this selected margin area digital touch data with an AFE of each of the other touch controller/s that are coupled to monitor touch-sensing layer segments that have a boundary adjacent the defined margin area of the given touch-sensing layer segment of the touchscreen display device.

Sharing of margin area digital touch data between AFEs of adjacent touch-sensing layer segments enables each touch controller to accurately determine (e.g., compute) the user touch intent after resolving any existing boundary conflict between digital touch data that corresponds to adjacent touch sensor segments. In one embodiment, a multi-touch controller algorithm may be simultaneously implemented by a programmable integrated circuit of each of the separate touch controllers of a touchscreen display device to resolve boundary conflicts and determine user touch intent. Once each of the touch controllers have shared its fully resolved Touch & Pen data with the Host PC, the host Platform CPU & OS can reconstruct the full Touch & Pen Maps back to the Application.

In one embodiment, width of each margin area (i.e., "sharing area" width) of a given touch-sensing layer segment may be dynamically defined or selected in real time based on factors such as user finger size, e.g., to better differentiate and accept an intentional user finger touch event while identifying and rejecting unintentional user touch events (e.g., such as palm touch, arm touch, etc.). In another embodiment, width of a middle boundary region of a given touch-sensing layer segment may be dynamically selected in real time based on current touchscreen display use context, such as current touchscreen display device orientation and/or posture, current touchscreen display device mode (e.g., such as book mode, tablet mode, traditional notebook with internal keyboard mode, notebook with external keyboard mode, etc.), current operating system (OS) application context, current hinge angle, etc.

By sharing digital touch data between different touch controllers while at the same time using a multi-touch controller algorithm to resolve boundary conflicts between the different touch controllers, routing of touch sensor transmit (TX) and receive (RX) lines may advantageously be simplified (and corresponding flexible printed circuit size reduced) as compared to a conventional solution that requires hardwire connections to transfer analog touch signals (TX and RX signals) to a first touch controller from an adjacent sensor segment assigned to a different and second touch controller, i.e., such as illustrated in FIG. 1. Moreover, the disclosed systems and methods may be implemented to share digital touch data between multiple touch controllers, and to resolve boundary conflicts between the multiple touch controllers, in a manner that is agnostic to (or implemented independent of) particular information handling system platform OS, basic input/output system (BIOS) and/or embedded controller (EC) configurations. The disclosed systems and methods may also be implemented to share digital touch data and resolve touch controller conflicts without the need for increased bandwidth and OS processing, e.g., by using USB-human interface device (HID) touch signals. The disclosed systems and methods may also be scaled up for larger touchscreen display devices (e.g., having 17 inch diagonal size or larger screens) using a larger number of touch controllers without increasing system and/or circuit wiring complexity and without increasing signal processing and routing delays.

In one respect, disclosed herein is an information handling system, including: a touch screen display device including at least first and second segments disposed in side-by-side relationship to each other with a boundary defined therebetween; a first analog to digital converter (ADC) coupled to the touch screen display device and receiving first analog signals corresponding to a user touch from the first segment and converting the first analog signals to respective first digital data that includes information identifying a current particular touched location on the first segment; and a second ADC coupled to the touch screen display device and receiving second analog signals corresponding to a user touch from the second segment and converting the second analog signals to respective second digital data that includes information identifying a current particular touched location on the second segment. The first ADC and the second ADC may be coupled together, with the first ADC providing to the second ADC a portion of the first digital data corresponding to a defined margin area of the first segment adjacent to the boundary between the first and second segments, and the second ADC providing to the second ADC a portion of the second digital data corresponding to a defined margin area of the second segment adjacent to the boundary between the second and second segments. The information handling system may further include at least one programmable integrated circuit coupled to the first ADC and at least one programmable integrated circuit coupled to the second ADC, the first ADC providing the first digital data combined with the provided portion of the second digital data to at least one programmable integrated circuit of the information handing system, and the second ADC providing the second digital data combined with the provided portion of the first digital data to at least one programmable integrated circuit of the information handling system. The information handling system may further include at least one programmable integrated circuit programmed to receive and combine the first digital data that is combined with the provided portion of the second digital data, with the second digital data that is combined with the provided portion of the first digital data, to form total combined digital data.

In another respect, disclosed herein is a method, including: displaying graphics images on a visual display area of a touch screen display device of an information handling system, the touch screen display device including at least first and second segments disposed in side-by-side relationship to each other with a boundary defined therebetween; receiving in a first analog to digital converter (ADC) first analog signals corresponding to a user touch from a first segment of the touchscreen display device, and converting the first analog signals to respective first digital data that includes information identifying a current particular touched location on the first segment; receiving in a second ADC second analog signals corresponding to a user touch from a second segment of the touchscreen display device, and converting the second analog signals to respective second digital data that includes information identifying a current particular touched location on the second segment, the first and second segments of the touchscreen display device being disposed in side-by-side relationship to each other with a boundary defined therebetween;

providing from the first ADC to the second ADC a portion of the first digital data corresponding to a defined margin area of the first segment adjacent to the boundary between the first and second segments, and providing from the second ADC to the first ADC a portion of the second digital data corresponding to a defined margin area of the second segment adjacent to the boundary between the first and second segments; in the first ADC combining the first digital data with the provided portion of the second digital data, and in the second ADC combining the second digital data with the provided portion of the first digital data; and combining the first digital data that is combined with the provided portion of the second digital data with the second digital data that is combined with the provided portion of the first digital data to form total combined digital data.

BRIEF DESCRIPTION OF THE DRAWINGS

FIG. 8 illustrates examples of different possible user modes of a foldable information handling system according to one exemplary embodiment of the disclosed systems and methods

DESCRIPTION OF ILLUSTRATIVE EMBODIMENTS

Figure 1:
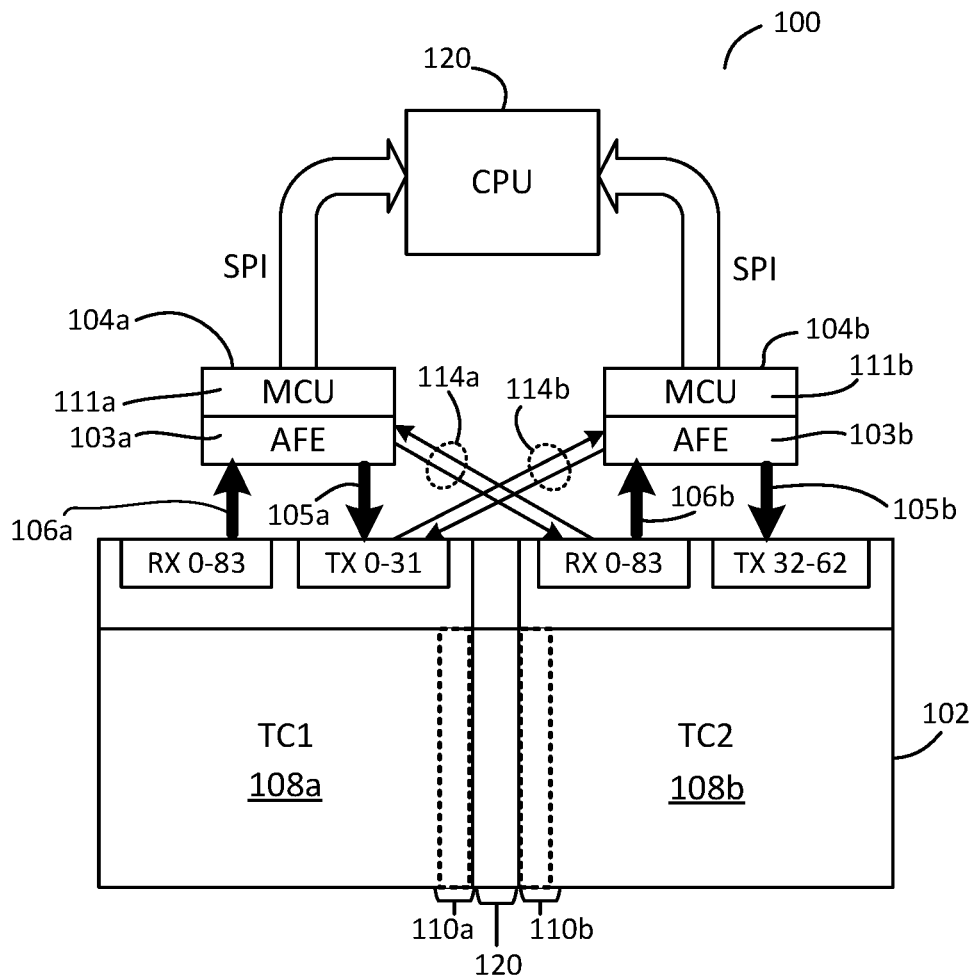
FIG. 1 illustrates a conventional technique for implementing dual touch controllers for a common touchscreen.
Figure 2:
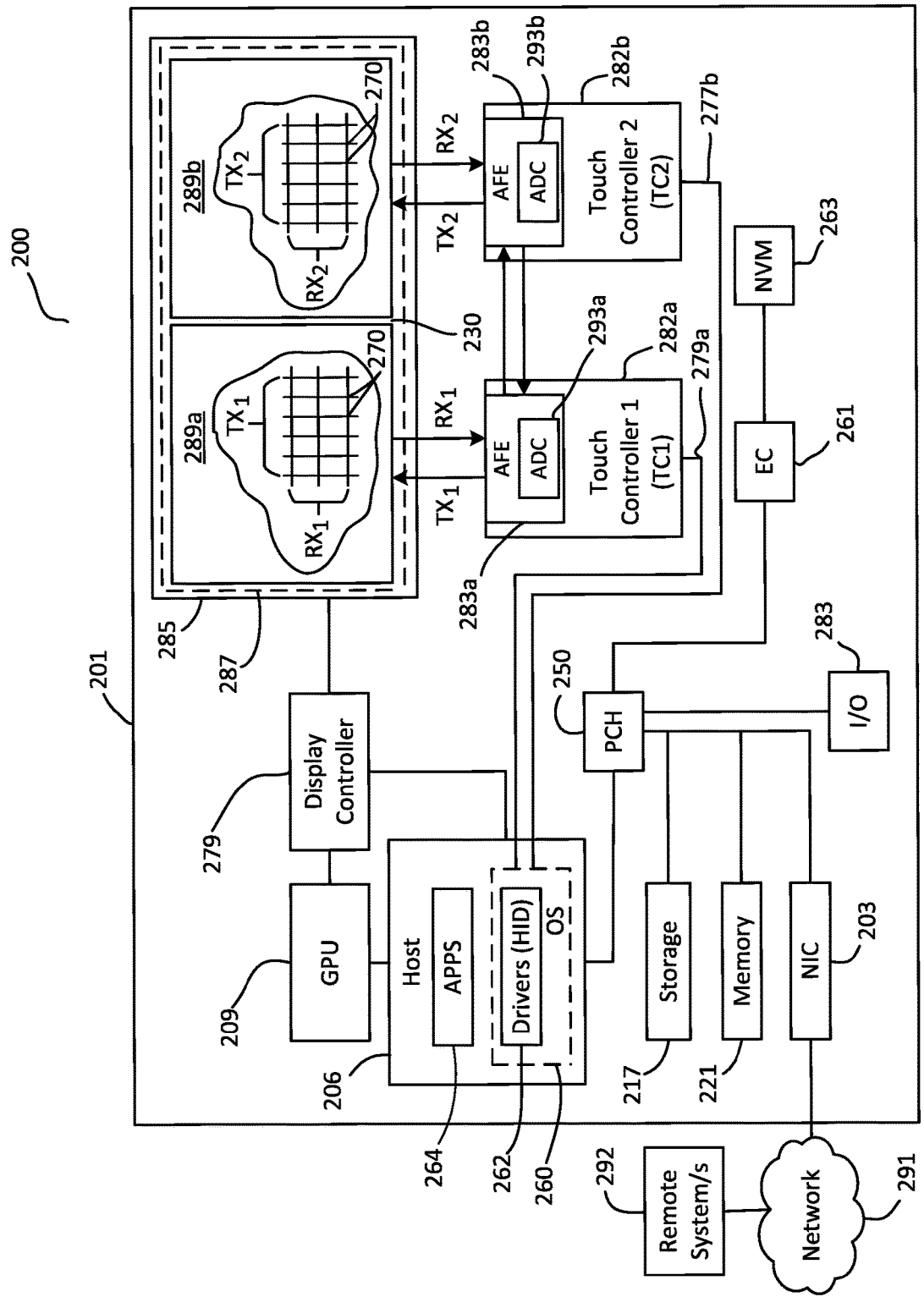
FIG. 2 illustrates a block diagram of dual screen information handling system according to one exemplary embodiment of the disclosed systems and methods.

FIG. 2 illustrates one exemplary embodiment of an information handling system 200 configured as single-display portable information handling system (e.g., battery-powered laptop or tablet device having a foldable touchscreen 285), although the disclosed systems and methods may be implemented with other types of information handling system configurations such as desktop or tower computer configurations, workstation configurations, notebook computer configurations, etc. In the illustrated embodiment of FIG. 2, the indicated components of system 200 are contained within a chassis enclosure 201 (e.g., foldable plastic or composite enclosure) that contains internal components of the information handling system 200 therein. Examples of system components illustrated in the embodiment of FIG. 2 include touchscreen display device 285 (e.g., including a single 17 inch diagonal or larger display screen 287 layered together with at least two separate side-by-side touch-sensing layer segments 289a and 289b), host programmable integrated circuit 206, optional discrete graphics processing unit (GPU) 209, system memory 221, storage device 217, and a network interface controller (NIC) 203.

In one embodiment, host programmable integrated circuit 206 may be a central processing unit (CPU) that executes an operating system (OS) 260 (e.g., Microsoft Windows 10 OS, Linux OS, etc.), applications 264, and other software/firmware for system 200. As shown OS 260 may include driver/s 262 such as a human interface device (HID) touchscreen driver. Host 206 may include, for example, an Intel Xeon series processor, an Advanced Micro Devices (AMD) processor or another type of programmable integrated circuit.

Still referring to the exemplary embodiment of FIG. 2, host 206 is shown coupled to system memory 221 via a data channel. System memory 221 may be volatile and/or non-volatile memory and may include, for example, random access memory (RAM), read only memory (ROM), dynamic RAM (DRAM), synchronous DRAM (SDRAM), and/or other suitable storage mediums. Host 206 is also coupled to platform controller hub (PCH) 250, which facilitates input/output functions for information handling system 200. Local system storage 217 (e.g., one or more media drives such as solid state drives, hard disk drives, optical drives, etc.) are each coupled to PCH 250 to provide non-volatile storage for the information handling system 200. Optional input/output devices 283 (e.g., a keyboard, mouse, touchpad, etc.) may be coupled to PCH 250 as shown to enable a local system user to interact with components of information handling system 200 including application programs 264 or other software/firmware executing on host 206.

Also shown coupled to PCH 250 is network interface controller (NIC) 203 that may be present to allow host 206 to communicate in a wired and/or wireless manner with other remote information handling system devices 292 across network 291, e.g., which may be the Internet, corporate intranet or other suitable network communication medium. An embedded controller (EC) 261 may also be provided and coupled to non-volatile memory 263 as shown. EC 261 may perform out-of-band processing, including thermal and power management tasks, etc.

In the embodiment of FIG. 2, components of touchscreen display device 285 are integrated with other system components of FIG. 2 within the same chassis 201. As shown, optional GPU 209 is coupled in signal communication with host 206 to transfer instructions and data for generating graphics images from host 206 to the GPU 209. Optional GPU 209 may be an NVidia GeForce series processor, an AMD Radeon series processor, or another type of programmable integrated circuit that is configured to perform graphics processing tasks to provide output digital image signals (e.g., as frame buffer data) via video or image data bus or data conductors (e.g., HDMI, DVI, SVGA, VGA, etc.) to display controller 279 of display device 285 which displays digital images on display screen 287 (e.g., LED display, LCD display, or other suitable type of display screen technology). It will be understood that in other embodiments host 206 may alternatively provide such output digital video signals via video data bus or data conductors directly to display controller 279 of display device 285 for display of digital images on display screen 287, including in those cases where optional GPU 209 is not present.

In FIG. 2, touchscreen display device 285 includes a single unitary and continuous layered planar display screen 287 (e.g., including LED display layers, OLED display layers, LCD display layers, or other suitable type of layered display screen technology) that defines a single unitary and continuous planar visual display area as shown in dashed outline in FIG. 2. As further shown in FIG. 2, touchscreen display device 285 also includes one or more separate layers of touch-sensing sensor circuitry (e.g., capacitive layers, resistive layers technology, surface acoustic wave transducers, etc.) that define separate side-by-side respective planar touch-sensing layer segments 289a and 289b (shown in solid outline) that each overlies a portion of the visual display area of display screen 287 in stacked layered parallel relationship, with the plane of the layered planar display screen 287 disposed parallel to the plane of each of the side-by-side planar touch-sensing layer segments 289a and 289b. It will be understood that a layer of planar touch-sensing layer segments 289a and 289b may either physically contact a layer of layered display screen 287, or may overlie (or overlap) the area of layered display screen 287 with other layers disposed therebetween. Moreover, it will be understood that in other embodiments planar touch-sensing layer segments 289a and 289b may underlie (or be overlapped by) the area of layered display screen 287.

In this embodiment of FIG. 2, the $RX_1$ lines of touch-sensing layer segment 289a are not connected to the $RX_2$ lines of touch-sensing layer segment 289b. Instead, each of $RX_1$ lines and $RX_2$ lines terminate (are cut) at middle boundary region 230 and therefore do not extend across the full length of touch-sensing sensor circuitry of touchscreen display device 285. The touch-sensing sensor circuitry of each touch-sensing segment dynamically senses in real time the presence and specific location/s (e.g., X, Y coordinate positions, etc.) where a user touches the respective touch-sensing segment with a finger (as used herein the term "finger" includes a thumb), hand, stylus or pen, etc.

For example, in one exemplary embodiment, each of touch-sensing layer segments 289a and 289b of FIG. 2 includes a plurality of regularly-spaced drive or transmit (TX) lines and a plurality of regularly-spaced sense or receive (RX) lines that are oriented perpendicular to the transmit (TX) lines to form a grid of TX and RX lines. In this grid configuration, the TX and RX lines cross each other in perpendicular spaced planes to form sense nodes 270 at each crossing point. As shown in FIG. 2, touch controllers 282a and 282b (e.g., each configured for supporting a single 7 to 8 inch diagonal size touchscreen display) may be coupled by separate transmit (TX) signal conductors and receive (RX) signal conductors to the respective TX and RX lines of separate touch-sensing layer segments 289a and 289b, respectively. In such an embodiment, touch controller 282a supplies a drive signal across a respective signal conductor $TX_1$ to each of the $TX_1$ lines of touch-sensing layer segment 289a and touch controller 282b supplies a drive signal across a respective signal conductor $TX_2$ to each of the $TX_2$ lines of touch-sensing layer segment 289b.

Still referring to FIG. 2, when a human user touches a particular location on either touch-sensing layer segments 289a or 289b, a touch event may be detected by the corresponding respective touch controller 282a or 282b at one or more of the sense nodes of the touch segment layer 289a or 289b by detecting a change in the signal charge caused by a change in the capacitance induced across one or more of its sense nodes 270 at that current particular touched location (e.g., at X, Y coordinate position/s corresponding to the current particular touched location). These signal charges are injected into the respective $RX_1$ and $RX_2$ lines of touch segment layers 289a and 289b. In such an embodiment, touch controller 282a receives a charge signal (across a respective electrical conductor $RX_1$) as an analog sense signal in its analog front end (AFE) 283a from each of the $RX_1$ lines of touch-sensing layer segment 289a, and touch controller 282b receives a charge signal (across a respective electrical conductor $RX_2$) as an analog sense signal in its AFE 283b from each of the $RX_2$ lines of touch-sensing layer segment 289b.

An internal analog to digital converter (ADC) 293a of the AFE 283a of touch controller 282a and an internal ADC 293b of the AFE 283b of touch controller 282b of FIG. 2 converts the received analog sense signals of the respective $RX_1$ lines and $RX_2$ lines to digital touch data (e.g., including information identifying the X, Y coordinate position/s corresponding to a current particular touched location), and a microcontroller (MCU) of the respective touch controller 282a or 282b processes this digital touch data to produce a heat map that includes any identified touch events and their sensed current user touch locations (e.g., that identifies occurrence of the current particular touch event and that identifies the sensed X, Y coordinate position/s corresponding to the touched location of the current particular touch event). Each of touch controllers 282a and 282b forwards this information (i.e., identified touch events and their sensed current user touch locations) as digital HID touch protocol signals (e.g., Microsoft human interface device (HID) events) to a HID touchscreen driver 262 of OS 260 on host programmable integrated circuit 206, e.g., via a data bus 277a or 277b such as serial peripheral interface (SPI). In an alternative embodiment, each of touch controllers 282a and 282b may forward this information (i.e., identified touch events and their sensed current user touch locations) as digital Microsoft (MSFT) Heatmap Touch Protocol data to a MSFT heatmap driver of OS 260 on host programmable integrated circuit 206. This is also an alternative data transfer technique for all other embodiments herein that are described as using digital HID touch protocol signals transmitted to the host programmable integrated circuit 206.

As further described and illustrated herein, the respective AFEs 283a and 283b of touch controllers 282a and 282b may also exchange at least a portion of their digital touch data between each other that corresponds to a defined margin area of each respective touch-sensing layer segment that lies adjacent to a middle boundary region 230 of the touchscreen display that is defined between adjacent $TX_1$ and $TX_2$ lines of the respective separate adjacent touch-sensing layer segments 289a and 289b.

Further information on configuration and operation of touchscreen display technology may be found, for example, in U.S. Pat. Nos. 10,216,304; 10,276,081; 10,656,761; and in U.S. patent application Ser. No. 16/833,634 filed Mar. 29, 2020; each of which the foregoing being incorporated herein by reference in its entirety for all purposes.

Figure 3:
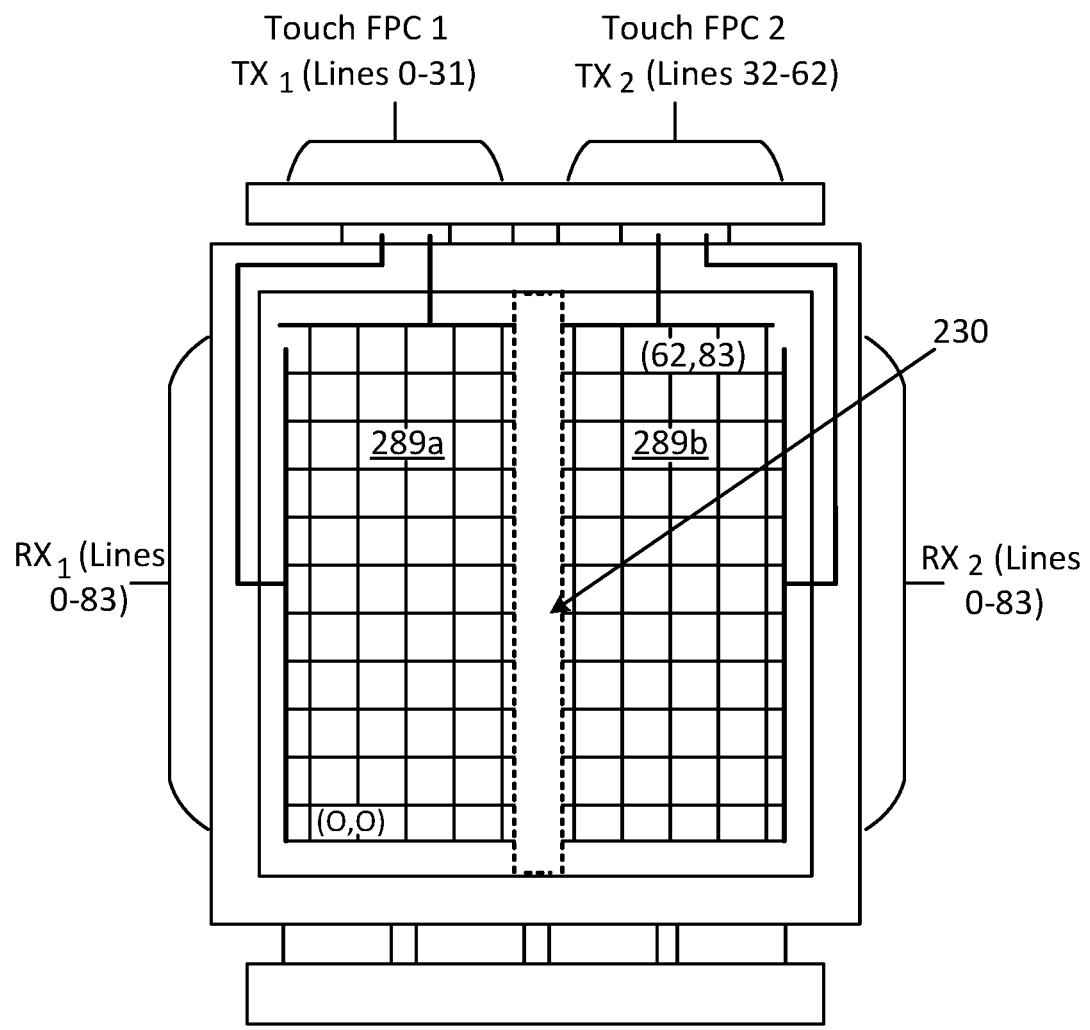
FIG. 3 illustrates touch-sensing layer segments according to one exemplary embodiment of the disclosed systems and methods.

FIG. 3 illustrates touch-sensing layer segments 289a or 289b according to one exemplary embodiment. As shown in FIG. 3, touch-sensing layer segment 289a in includes a grid of 84 horizontal $RX_1$ lines ($RX_1$ lines 0-83) and 32 vertical $TX_1$ lines ($TX_1$ lines 0-31) that are coupled by respective signal conductors $RX_1$ and $TX_1$ to AFE 283a of first touch controller 282a (TC1). As further shown, touch-sensing layer segment 289b includes a grid of 84 horizontal $RX_2$ lines ($RX_2$ lines 0-83) and 30 vertical $TX_2$ lines ($TX_2$ lines 32-62) that are coupled by respective signal conductors $RX_2$ and $TX_2$ to AFE 283b of second touch controller 282b (TC2).

Figure 4:
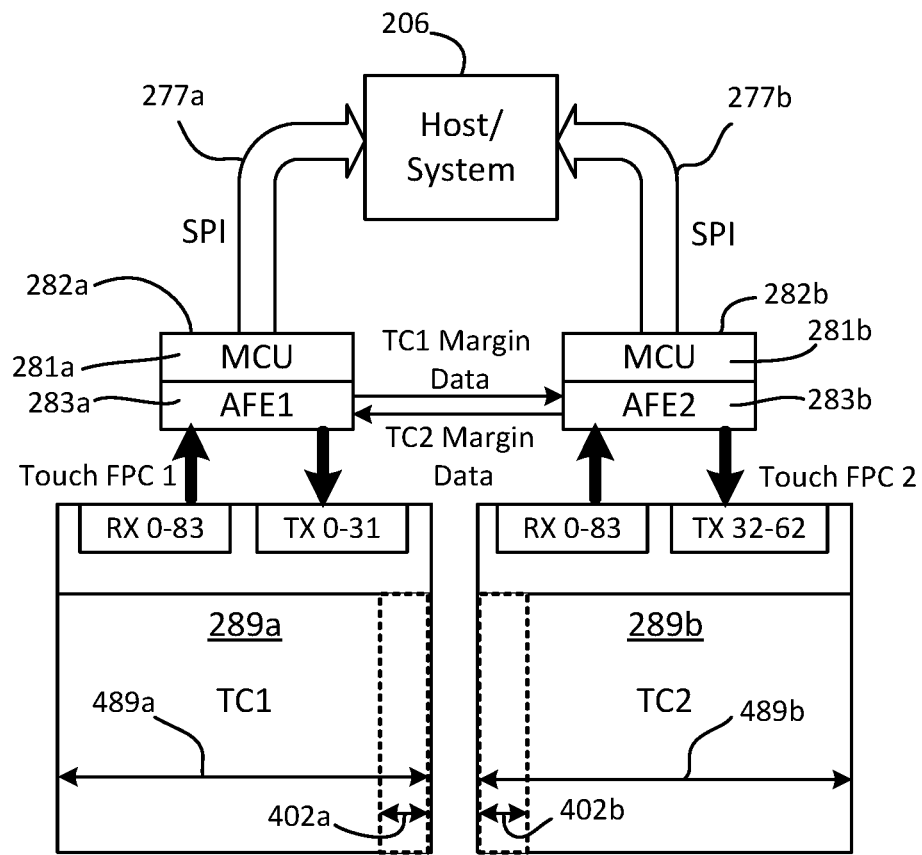
FIG. 4 illustrates a simplified block diagram of a host programmable integrated circuit, touch controllers, and the respective analog touch-sensing areas of each of multiple different touch-sensing layer segments according to one exemplary embodiment of the disclosed systems and methods.
Figure 7:
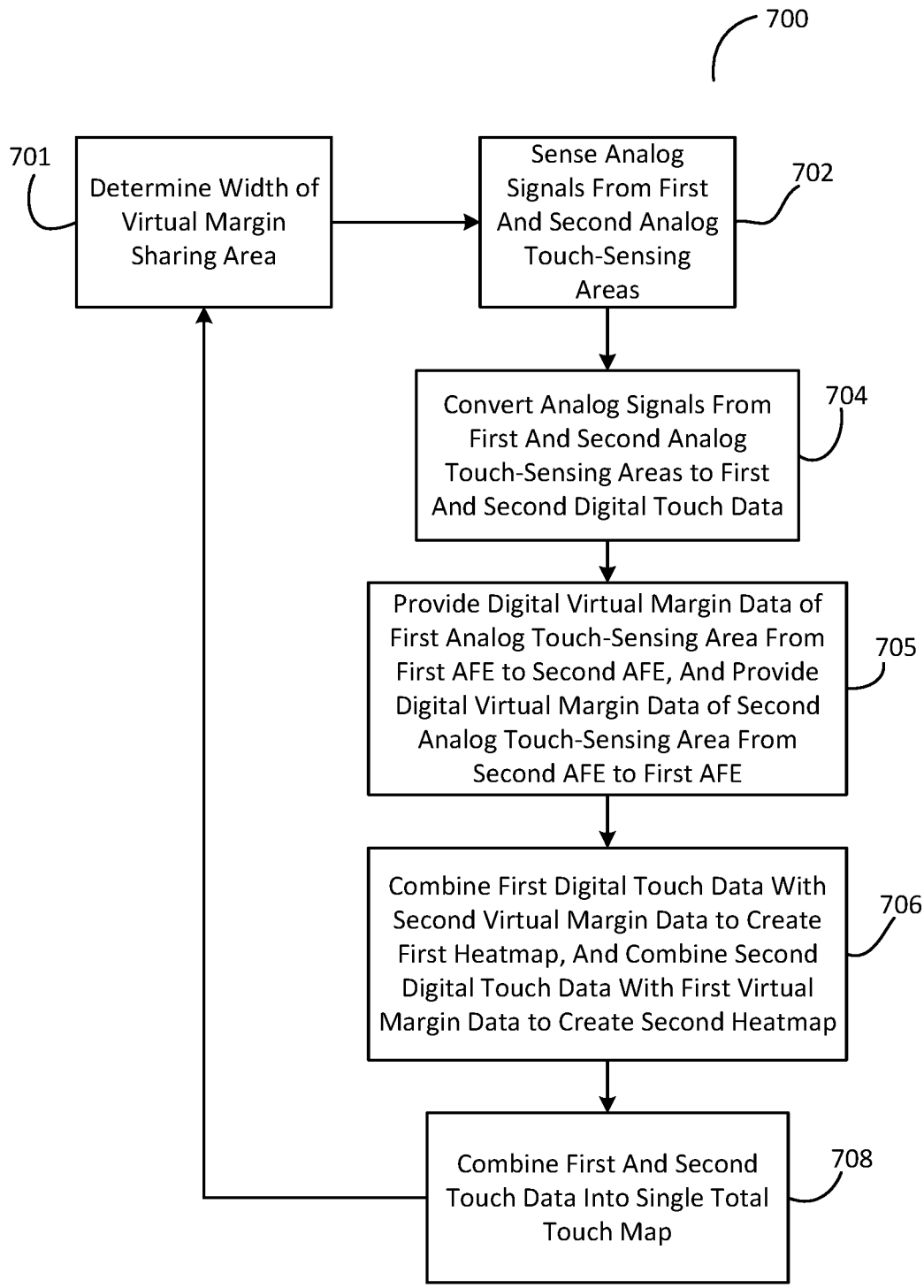
FIG. 7 illustrates methodology according to one exemplary embodiment of the disclosed systems and methods.

FIG. 4 illustrates a simplified block diagram of one embodiment of host programmable integrated circuit 206, touch controllers 282a and 282b, and the respective analog touch-sensing areas 489a and 489b of each of touch-sensing layer segments 289a or 289b. FIG. 7 illustrates a methodology 700 as it may be performed according to one exemplary embodiment.

In particular, FIG. 4 depicts the analog touch-sensing areas 489a and 489b of touch-sensing layer segments 289a or 289b as they are sensed in step 702 of methodology 700 by respective AFE 283a and 283b of touch controllers 282a and 282b. FIG. 4 also shows a defined analog-sensed margin area 402a of the analog touch-sensing area 489a of touch-sensing layer segment 289a and a defined analog-sensed margin area 402b of the analog touch-sensing area 489b of touch sensing layer segment 289b. Each of analog-sensed margin areas 402a and 402b that are located adjacent and to either side of middle boundary region 230 that exists between the rightmost $TX_1$ line 31 of touch-sensing layer segment 289a and the leftmost $TX_2$ line 32 of touch-sensing layer segment 289b.

Still referring to FIG. 4, the width of middle boundary region 230 between touch-sensing layer segments 289a and 289b is the distance between $TX_1$ line 31 (that is coupled to first touch controller 282a) and $TX_2$ line 32 (that is coupled to second touch controller 282b). It will be understood that the respective widths of margin areas 402a and 402b may be defined (e.g., selected) by real time commands to AFEs 283a and 283b from respective MCU 281a and 281b to fit the needs of a given configuration of information handling system 200 as shown in step 701 of FIG. 7. Just as an example, width of margin area 402a may be defined to include $TX_1$ lines 30 and 31, and width of margin area 402a may be defined to include $TX_2$ lines 32 and 33. However, margin areas 402a and 402b may be defined to have any other greater or lesser width by selecting a different number of $TX_1$ lines and $TX_2$ lines for including in each of the margin areas 402a and 402b.

As described further herein in relation to FIG. 8, in one optional embodiment the respective widths of each of margin areas 402a and 402b may be dynamically changed (e.g., in real time by command from respective MCUs 281a and 281b) to fit the changing needs of different configurations or use-cases of information handling system 200, e.g., as detected and reported to MCUs 281a and 281b by host programmable integrated circuit 206 and/or EC 261. In one embodiment, the respective widths (i.e., number of TX lines) of margin areas 402a and 402b may be defined to be the same as each other at any given time, although it is alternatively possible that widths of margin areas 402a and 402b may be defined to be different from each other at the same time by defining a number of $TX_1$ lines for including in margin area 402a that is different from the number of $TX_2$ lines defined for including in margin area 402b.

Returning to FIG. 4, first AFE 283a converts sensed analog signals from first analog touch-sensing area 489a to corresponding first digital touch data, and second AFE 283b converts sensed analog signals from second analog touch-sensing area 489b to corresponding second digital touch data. This corresponds to step 704 of methodology 700. As further shown in FIG. 4, first AFE 283a converts sensed analog signals of margin area 402a to first digital touch data of margin area 402a and provides it to second AFE 283b via an existing electrical interface (e.g., UART, I²C, SPI, etc.) in step 705 of methodology 700. At the same time, second AFE 283b converts sensed analog signals of margin area 402b to second digital touch data of margin area 402b and provides it to first AFE 283a via an existing electrical interface (e.g., UART, I²C, SPI, etc.) in step 705 of methodology 700.

Figure 5:
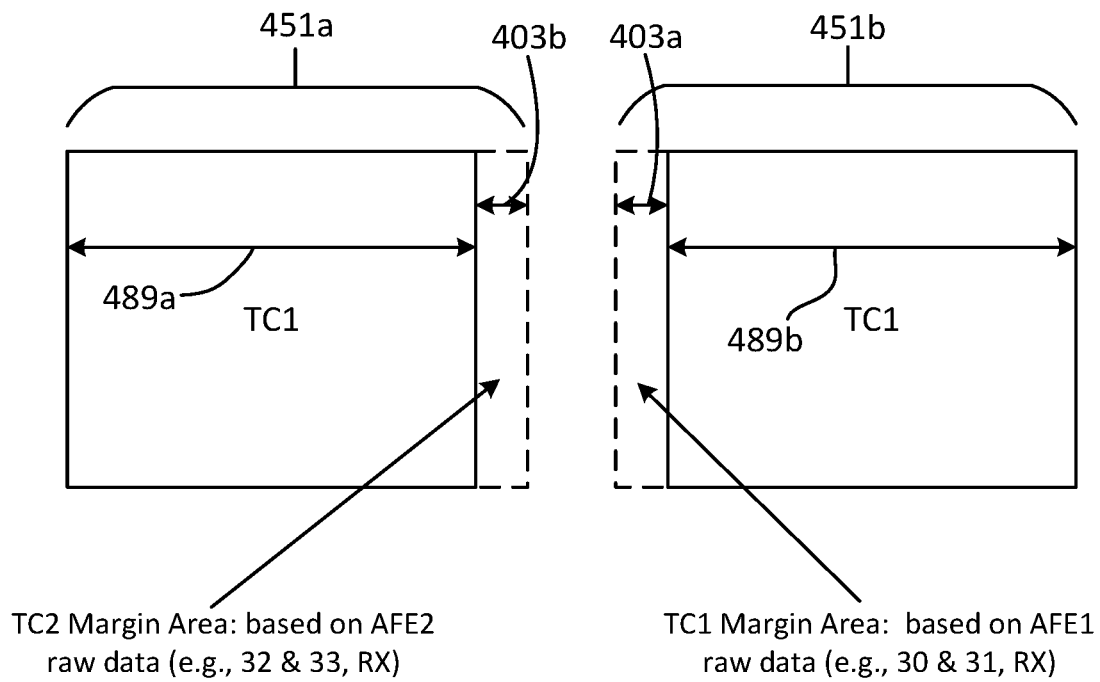
FIG. 5 illustrates a visual representation of digital touch data provided by the internal analog-to-digital converters (ADCs) of multiple analog front ends (AFEs) to respective microcontroller units (MCUs) of multiple touch controllers respectively according to one exemplary embodiment of the disclosed systems and methods.

FIG. 5 illustrates a visual representation of digital touch data provided by the internal ADCs of AFEs 283a and 283b to MCUs of touch controllers 282a and 282b, respectively. As shown, AFE 283a combines digital touch data of first touch sensing area 489a with digital touch data 403b of second margin area 402b that is received from AFE 283b, and provides this combined digital touch data 451a as a first heat map to MCU 281a of touch controller 282a. At the same time, AFE 283b combines digital touch data of second touch sensing area 489b with digital touch data 403a of first margin area 402a that is received from AFE 283a, and provides this combined digital touch data 451b as a second heat map to MCU 281b of touch controller 282b. This operation is described in step 706 of methodology 700.

Figure 6:
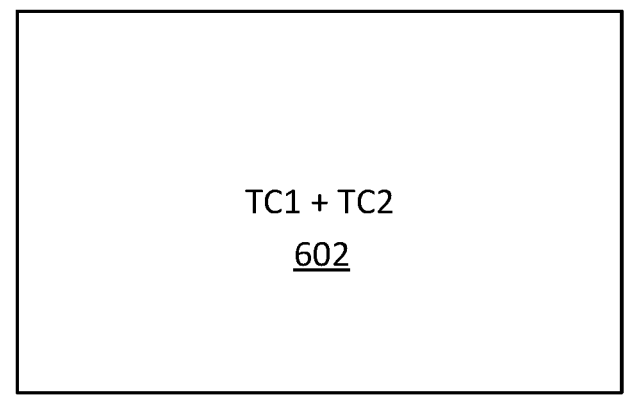
FIG. 6 illustrates a representation of digital touch data received from multiple touch controllers and processed in a host programmable integrated circuit according to one exemplary embodiment of the disclosed systems and methods.

FIG. 6 illustrates a visual representation of digital touch data received from touch controllers 282a and 282b and processed in host programmable integrated circuit 206. As shown, an HID touchscreen driver in host programmable integrated circuit 206 has combined the first combined digital touch data 451a and the second combined digital touch data 451b of FIG. 5 that is received from respective touch controllers 282a and 282b into a single continuous and unitary total touch map 602 for touchscreen display device 285, e.g., in step 708 of methodology 700. Since the first combined digital touch data 451a includes digital touch data of second margin area 402b from second analog touch-sensing area 489b that corresponds to and aligns with a portion of the digital touch data of second touch sensing area 489b, and the second combined digital touch data 451b includes digital data of first margin area 402a from first analog touch-sensing area 489a that corresponds to and aligns with a portion of the digital touch data of first touch sensing area 489a, any boundary conflicts that would otherwise exist between digital touch data corresponding to the separate first and second analog touch-sensing areas 489a and 489b is already resolved in first and second combined digital touch data 451a and 451b (by touch controllers 282a and 282b, respectively) before first and second combined digital touch data 451a and 451b are combined into the total touch map 602 by host programmable integrated circuit 206. Therefore, first combined digital touch data 451a is automatically aligned with second combined digital touch data 451b when combined digital touch data 451a and 451b are combined into total touch map 602 by host programmable integrated circuit 206, and without any boundary resolution action taken by OS 260 on by host programmable integrated circuit 206.

FIG. 8 is a table illustrating some examples of different designated widths of each of margin sharing areas 402a and 402b (listed in "Sharing Area" row of the table of FIG. 8) for different possible user modes of a foldable information handling system 200 (e.g., a portable battery-powered foldable information handling system with a unitary continuous display screen that is foldable about a hinged center line 850 of the display screen as shown FIG. 8). In FIG. 8, different user modes that provide different user experiences are illustrated in the "Picture" row of the table of FIG. 8. In the table of FIG. 8, the "Remark" row describes example factors that may be considered when assigning the different widths of each of margin sharing areas 402a and 402b. In one embodiment, the width of margin sharing areas 402a and 402b may be dynamically selected and defined in real time (e.g., by MCUs 281a and 281b) according to the determined current user mode of information handling system 200 (e.g., as detected and reported to MCUs 281a and 281b by host programmable integrated circuit 206 and/or EC 261) as shown by repeating from step 708 to step 701 of FIG. 7. Other factors which may be considered when assigning the different widths of each of margin sharing areas 402a and 402b include, but are not limited to, current operating system (OS) application context, current hinge or fold angle, etc.

As described above, the predefined widths of margin sharing areas 402a and 402b may be dynamically selected and varied based on sensed user mode, e.g., as sensed by host programmable integrated circuit 206 and/or EC 261. In such an embodiment, host programmable integrated circuit 206 and/or EC 261 may optionally provide control signals to touch controllers 282a and 282b to cause touch controllers 282a and 282b to implement the different widths of margin sharing areas 402a and 402b, e.g., according to a lookup table storing a relationship between user mode and sharing area width such as shown in "User Mode" and "Sharing Area" rows of the table of FIG. 8. Such a lookup table may be stored, for example, in non-volatile memory 263 and/or storage 217. As an example, to implement the example margin sharing area widths for the embodiment of FIG. 8, the following signals may be received and processed by touch controllers 282a and 282b:

1) For 5 Millimeter Margin Sharing Area of Book Mode:
   TC1 analog-sensed margin area 402a (X-axis, Y-axis)= (TX$_1$ lines 30&31, RX$_1$ lines 0-83)
   TC2 analog-sensed margin area 402b (X-axis, Y-axis)= (TX$_2$ lines 32&33, RX$_2$ lines 0-83).

2) For 10 Millimeter Margin Sharing Area of Tablet Mode:
   TC1 analog-sensed margin area 402a (X-axis, Y-axis)= (TX$_1$ lines 28-31, RX$_1$ lines 0-83)
   TC2 analog-sensed margin area 402b (X-axis, Y-axis)= (TX$_2$ lines 32-35, RX$_2$ lines 0-83).

The single continuous and unitary total touch map 602 for touchscreen display device 285 may then be analyzed by OS 260 (e.g., using HID touchscreen driver 262) to interpret user finger and pen (or stylus) touch gestures that are input to touch-sensing sensor circuitry of touchscreen display device 285. These interpreted user gestures may be provided (e.g., by HID touchscreen driver 262) to other software and/or firmware executing on host programmable integrated circuit 206 (e.g., such as application/s 264 and/or integrated graphics of host 206) or on other programmable integrated circuits (e.g., such as GPU 209) of information handling system 200. Other software and/or firmware receiving these interpreted user gestures may respond by taking one or more display actions according to the user gestures (e.g., such as changing or moving graphic images displayed on touchscreen display device 285 by moving a displayed cursor, moving or resizing a displayed application window, selecting a displayed button or web link, etc.), taking one or more application actions according to the user gestures (e.g., such as opening or closing a given application 264, performing an application action designated by the interpreted user gesture, accepting entry of data by the interpreted user gesture, etc.), etc.

Figure 9:
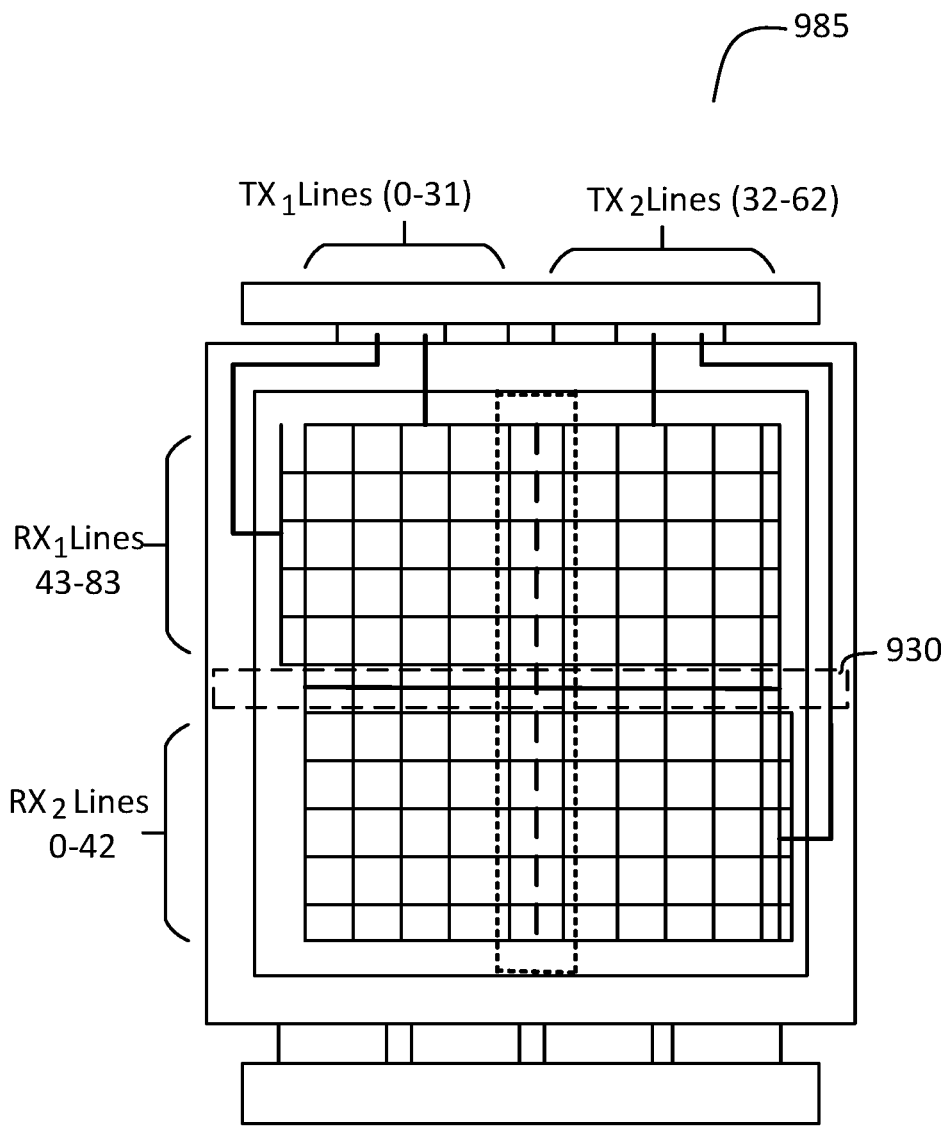
FIG. 9 illustrates a touch-sensing layer according to one exemplary embodiment of the disclosed systems and methods.
Figure 10:
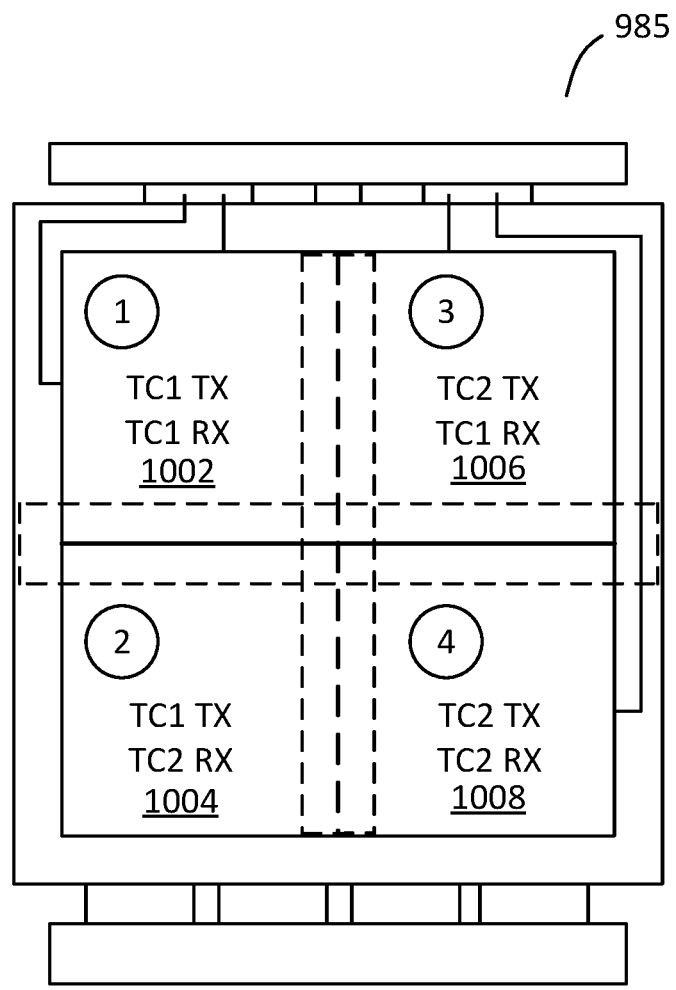
FIG. 10 illustrates multiple separate sensing regions of touch-sensing sensor circuitry according to one exemplary embodiment of the disclosed systems and methods.
Figure 11:
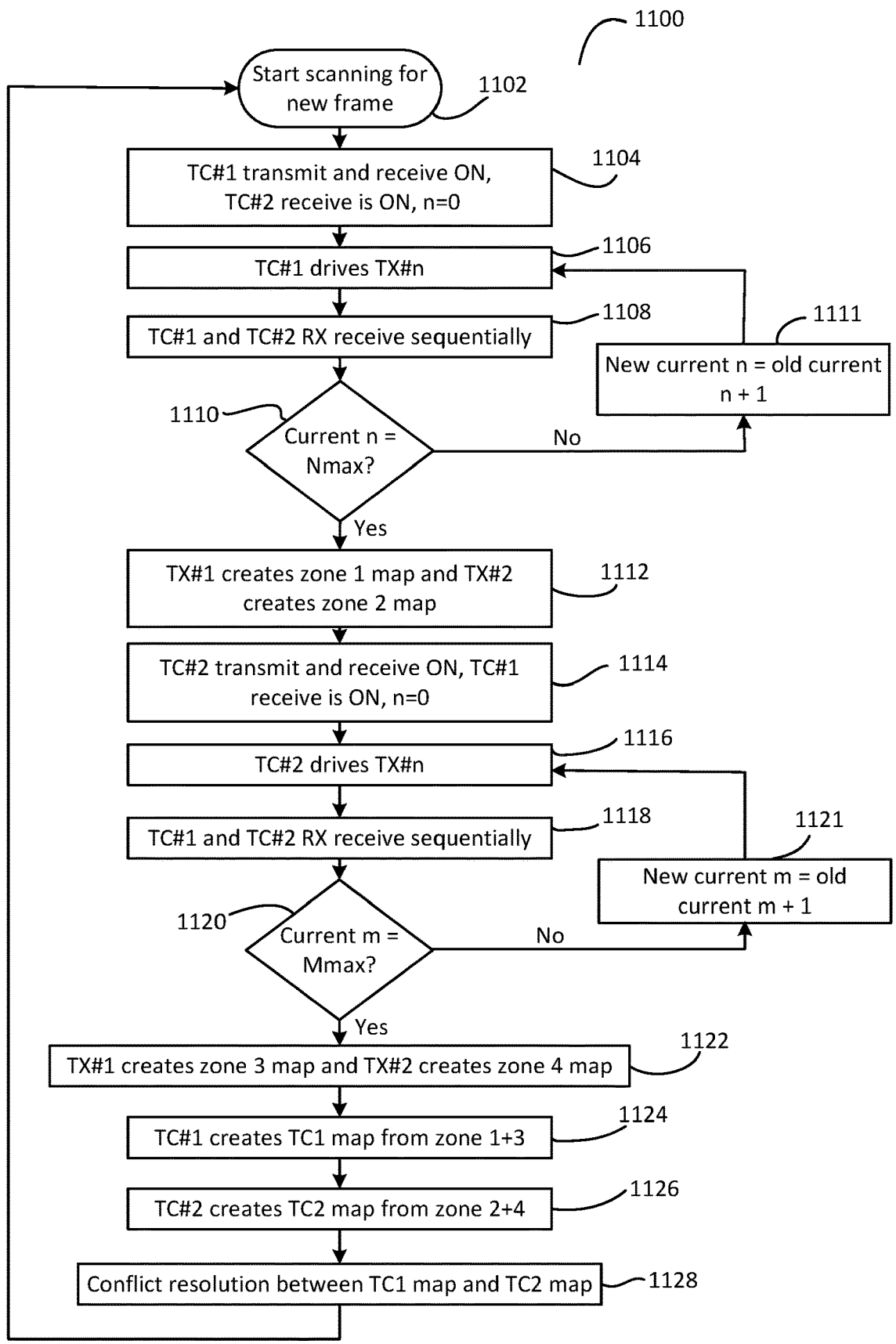
FIG. 11 illustrates methodology according to one exemplary embodiment of the disclosed systems and methods.

FIGS. 9-11 illustrate an alternative embodiment of a touchscreen display device 985 that includes a layered display screen that defines a single continuous visual display area similar to that described in relation to the embodiment of FIG. 2. In this embodiment, touchscreen display device 985 includes a separate layer of touch-sensing sensor circuitry (e.g., capacitive layers, resistive layers technology, surface acoustic wave transducers, etc.) that defines a touch-sensing layer that overlies the visual display area of display screen 287 as shown in FIG. 9. In this embodiment, touch-sensing sensor circuitry of touchscreen display device 985 includes a plurality of regularly-spaced drive or transmit (TX) lines and a plurality of regularly-spaced sense or receive (RX) lines that are oriented perpendicular to the transmit (TX) lines to form a grid of TX and RX lines. In this grid configuration, the TX lines and RX lines cross each other in perpendicular spaced planes to form sense nodes at each crossing point.

As described further below, the TX lines and RX lines of touch-sensing sensor circuitry of touchscreen display device 985 are configured differently than are the TX lines and RX lines of the touch-sensing circuitry embodiment of touchscreen display device 285 of FIG. 2, but may be operatively coupled to multiple touch controllers 282*a* and 282*b* of FIG. 2 as described below. In one embodiment, touchscreen display device 985 may have a 17 inch (or larger) diagonal size touchscreen display that is coupled to multiple touch controllers 282*a* and 282*b* (e.g., touch controllers each configured for supporting a single 7 to 8 inch diagonal size touchscreen display). In this embodiment, touch-sensing circuitry of touchscreen display device 985 forms a single continuous touch sensor, which is a standard design sensor that may accommodate either a single or multiple touch controller architecture, thus reducing supply chain cost and manufacturing complexity. Further, the RX lines of the touch sensor circuitry may be evenly distributed on both sides of the sensor enabling narrowest borders to be provided in one embodiment.

Still referring to FIG. 9, the signal conductors of each of the RX lines extends across the full length of touch-sensing sensor circuitry of touchscreen display device 985, extending from the left edge to the right edge of touch-sensing sensor circuitry of touchscreen display device 985 without any discontinuity (i.e., gap or cut) in the RX lines, TX lines, or the quadrants of touch-sensing sensor circuitry controlled by the different touch controllers 282*a* and 282*b* as shown in FIG. 10). In the embodiment of FIG. 9, touch controller 282*a* (TC1) may be coupled by respective $TX_1$ signal conductors to a first (leftmost) group of $TX_1$ lines, and coupled by respective $RX_1$ signal conductors to a first (uppermost) group of $RX_1$ lines. Similarly, touch controller 282*b* (TC2) may be separately coupled by respective $TX_2$ signal conductors to a second (rightmost) group of $TX_2$ lines, and by respective $RX_2$ signal conductors to a second (lowermost) group of $RX_2$ lines. Thus, a boundary area 930 separates the first (uppermost) group of $RX_1$ lines coupled to touch controller 282*a* from the second (lowermost) group of $RX_2$ lines coupled to touch controller 282*b*.

The embodiment of FIGS. 9-11 may be implemented to provide a One Transmit (TX)—Each Receive (RX) touch controller architecture which leverages the fact that most touch controllers are designed for use with a rectangular-shaped Aspect Ratio in which the touch controller has more RX than TX lines. It will be understood that the architecture and algorithm of FIGS. 9-11 are scalable to two or more touch controllers and to touchscreen display sizes larger than 17 inch diagonal size.

FIG. 10 illustrates four separate sensing regions (or zones) 1002, 1004, 1006 and 1008 of touch-sensing sensor circuitry of FIG. 9 that may be defined when coupled to touch controllers 282*a* and 282*b* of FIG. 2. As shown, touch controller 282*a* (TC1) supplies a drive signal to each of $TX_1$ lines of quadrants 1002 and 1004, and touch controller 282*b* (TC2) supplies a drive signal to each of $TX_2$ lines of quadrants 1006 and 1008. At the same time, touch controller 282*a* (TC1) receives analog sense signals from each of $RX_1$ lines of quadrants 1002 and 1006, and touch controller 282*b* (TC2) receives analog sense signals from each of $RX_2$ lines of quadrants 1004 and 1008.

FIG. 11 illustrates one exemplary embodiment of touch-sensing scanning methodology 1100 that may be implemented in one exemplary embodiment by the combination of touch controllers 282*a* and 282*b* with the touchscreen display embodiment of FIGS. 9 and 10. As shown, methodology 1100 begins in step 1102, where scanning is started for a new frame. In step 1104, transmit and receive modes of touch controller 282*a* (TC1) are turned on, receive mode of touch controller 282*b* (TC2) is turned on, and a $TX_1$ line number counter value "n" is set to 0 for the first $TX_1$ line.

Next, in step 1106, touch controller 282*a* (TC1) provides a drive signal to the current "n" $TX_1$ line number in quadrants 1002 and 1004 (e.g., which is $TX_1$ line=0 for the first iteration). In step 1108, AFE 283*a* of touch controller 282*a* (TC1) and AFE 283*b* of touch controller 282*b* (TC2) sequentially receive analog sense signals (in $RX_1$ lines of quadrant 1002 and $RX_2$ lines of quadrant 1004) that correspond to the transmitted drive signal of step 1106, and convert these received values to digital touch data provided to MCU 282*a* and MCU 282*b*, respectively.

Next, in step 1110, it is determined whether the current value of "n" corresponds to the maximum "n" value (e.g., "Nmax") of the last $TX_1$ line (e.g., maximum "n" value of $TX_{1=31}$ in one embodiment). If not, then methodology 1100 proceeds to step 1111 and increments the current counter value of "n" by 1 (e.g., new current "n" value=previous "n" value+1) and returns to step 1106 and repeats as shown. When it is determined in step 1110 that the current "n" value equals the maximum "n" value (e.g., maximum "n" value=Nmax=31 in one embodiment), then methodology 1100 proceeds to step 1112 where MCU 281*a* of touch controller 282*a* (TC1) creates a heat map for quadrant 1002 (zone 1) and MCU 281*b* of touch controller 282*b* (TC2) creates a heat map for quadrant 1004 (zone 2).

Methodology 1100 then proceeds to step 1114 where transmit and receive modes of touch controller 282*b* (TC2) are turned on, receive mode of touch controller 282*a* (TC1) is turned on, and a $TX_2$ line number counter value "m" is set to 0 for the first $TX_2$ line. Next, in step 1116, touch controller 282*b* (TC2) provides a drive signal to the current "m" $TX_2$ line number in quadrants 1006 and 1008 (e.g., which is $TX_2$ line=0 for the first iteration). In step 1118, AFE 283*a* of touch controller 282*a* (TC1) and AFE 283*b* of touch controller 282*b* (TC2) sequentially receive analog sense signals (in $RX_1$ lines of quadrant 1006 and $RX_2$ lines of quadrant 1008) that correspond to the transmitted drive signal of step 1116, and convert these received values to digital touch data provided to MCU 281*a* and MCU 281*b*, respectively.

Next, in step 1120, it is determined whether the current value of "m" corresponds to the maximum "m" value (e.g., "Mmax") of the last $TX_2$ line (e.g., maximum "m" value of $TX_1$=30 in one embodiment). If not, then methodology 1100 proceeds to step 1121 and increments the current counter value of "m" by 1 (e.g., new current "m" value=previous "m" value+1) and returns to step 1116 and repeats as shown. When it is determined in step 1120 that the current "m" value equals the maximum "m" value (e.g., maximum "m" value=Mmax=30 in one embodiment), then methodology 1100 proceeds to step 1122 where MCU 281*a* of touch controller 282*a* (TC1) creates a heat map for quadrant 1006

(zone 3) and MCU 281*b* of touch controller 282*b* (TC2) creates a heat map for quadrant 1008 (zone 4).

Methodology 1100 of FIG. 11 then proceeds to step 1124 where touch controller 282*a* (TC1) combines heat map data for quadrants 1002 and 1006 to create a combined heat map for touch controller 282*a* (TC1), and provides this combined data as digital HID touch protocol data to host programmable integrated circuit 206. In step 1126, touch controller 282*b* (TC2) combines heat map data for quadrants 1004 and 1008 to create a combined heat map for touch controller 282*b* (TC2), and provides this combined data as digital HID touch protocol data to host programmable integrated circuit 206. In step 1128, host programmable integrated circuit 206 (e.g., using HID touchscreen driver 262) then combines the digital HID touch protocol data provided from touch controller 282*a* (TC1) and touch controller 282*b* (TC2) to create a single continuous and unitary total touch map for touchscreen display device 985, with any boundary conflicts between adjacent touch sensor segments already being resolved by the digital touch data shared between touch controller 282*a* (TC1) and touch controller 282*b* (TC2), and without any boundary resolution action taken by OS 260 on by host programmable integrated circuit 206. In one embodiment, step 1126 may be performed using the methodology of steps 705, 706 and 708 of FIG. 7.

Similar to previously described in relation to methodology 700 of FIG. 7, the single continuous and unitary total touch map for touchscreen display device 985 may then be analyzed by OS 260 (e.g., using HID touchscreen driver 262) to interpret user finger and pen (or stylus) touch gestures that are input to touch-sensing sensor circuitry of touchscreen display device 985. These interpreted user gestures may be provided (e.g., by HID touchscreen driver 262) to other software and/or firmware executing on host programmable integrated circuit 206 (e.g., such as application/s 264 and/or integrated graphics of host 206) or on other programmable integrated circuits (e.g., such as GPU 209) of information handling system 200. Other software and/or firmware receiving these interpreted user gestures may respond by taking one or more display actions according to the user gestures (e.g., such as changing or moving graphic images displayed on touchscreen display device 985 by moving a displayed cursor, moving or resizing a displayed application window, selecting a displayed button or web link, etc.), taking one or more application actions according to the user gestures (e.g., such as opening or closing a given application 264, performing an application action designated by the interpreted user gesture, accepting entry of data by the interpreted user gesture, etc.), etc.

Figure 12:
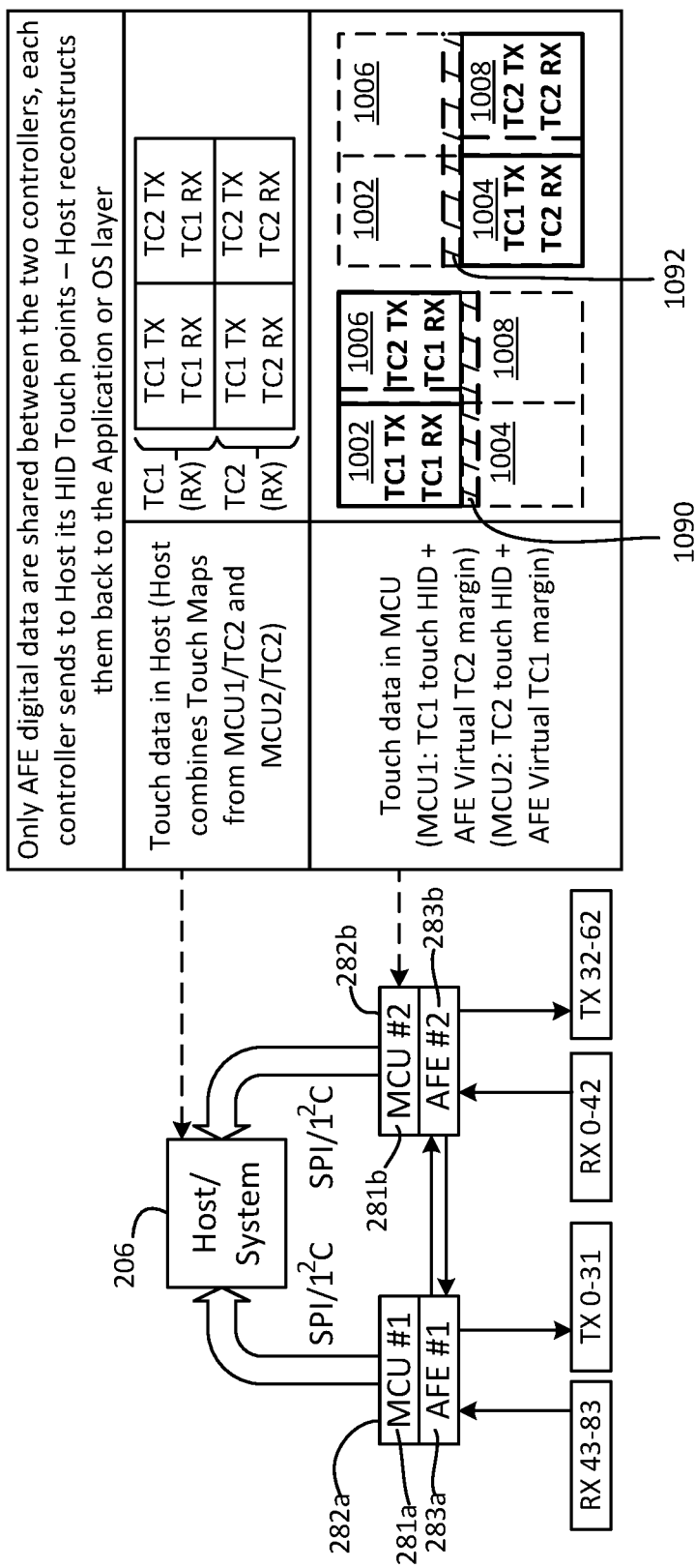
FIG. 12 illustrates a simplified block diagram of a multiple host touch interface architecture according one exemplary embodiment of the disclosed systems and methods.

FIG. 12 illustrates a simplified block diagram of a multiple (e.g., dual) host touch interface architecture embodiment that includes host programmable integrated circuit 206, touch controllers 282*a* and 282*b*, and the quadrants 1002, 1004, 1006 and 1008 of the single unitary analog touch-sensing area, such as employed in the methodology of FIG. 11. In this embodiment, AFE digital data is shared between touch controllers 282*a* and 282*b*, e.g., to enhance touch computation accuracy in the overlap/margin areas between the quadrants (shown in crosshatching in FIG. 12). In this regard, AFE 283*a* combines digital touch data of quadrants 1002 and 1006 with digital touch data of the crosshatched margin area 1090 of quadrants 1004 and 1008 that is received from AFE 283*b*, and provides this combined digital touch data as a first heat map to MCU 281*a* of touch controller 282*a*. At the same time, AFE 283*b* combines digital touch data of quadrants 1004 and 1008 with digital touch data of the crosshatched margin area 1092 of quadrants 1002 and 1006 that is received from AFE 283*a*, and provides this combined digital touch data as a second heat map to MCU 281*b* of touch controller 282*b*.

Figure 13:
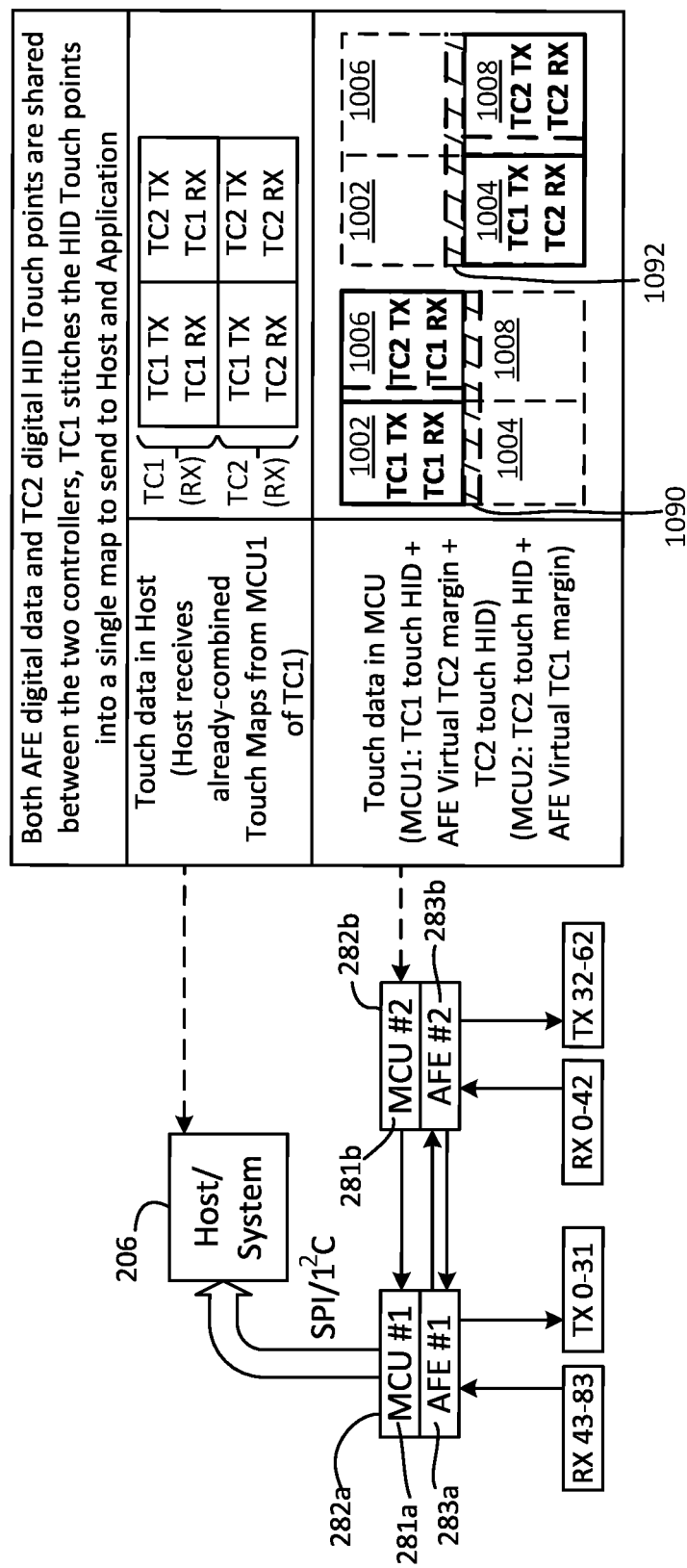
FIG. 13 illustrates a simplified block diagram of a single host touch interface architecture.

FIG. 13 illustrates a simplified block diagram of an alternative single host touch interface architecture embodiment that includes host programmable integrated circuit 206, touch controllers 282*a* and 282*b*, and the quadrants 1002, 1004, 1006 and 1008 of the single unitary analog touch-sensing area. In this embodiment, AFE digital data is again shared between touch controllers 282*a* and 282*b* to enhance touch computation accuracy in the overlap/margin areas between the quadrants (shown in crosshatching in FIG. 13) in the same manner as described for the embodiment of FIG. 12. However, HID touch point data is also shared from MCU 281*b* of touch controller 282*b* to MCU 281*a* of touch controller 282*a*, and MCU 281*b* of touch controller 282*b* stitches together the HID touchpoint data into a single combined touch controller touch map (that includes touch data of both touch controllers MCU 281*a* and 281*b*), which is then provided as digital HID touch data by a single data path to OS 260 and its drivers 262 and applications 264 for use as previously described.

Although FIGS. 2-13 illustrate certain embodiments employing two touch controllers that are coupled to two separate respective touch-sensing layer segments of a common touchscreen display device, it will be understood the disclosed systems and methods may be implemented in other embodiments using three or more touch controllers coupled (e.g., and cascaded) to three or more respective touch-sensing layer segments of a common touchscreen display device.

It will be understood that one or more of the tasks, functions, or methodologies described herein (e.g., including those described herein for components 203, 206, 209, 250, 261, 279, 281*a*, 281*b*, 282*a*, 282*b*, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
 a touch screen display device comprising at least first and second segments disposed in side-by-side relationship to each other with a boundary defined therebetween;
 a first analog to digital converter (ADC) coupled to the touch screen display device and receiving first analog signals corresponding to a user touch from the first segment and converting the first analog signals to respective first digital data that includes information identifying a current particular touched location on the first segment; and
 a second ADC coupled to the touch screen display device and receiving second analog signals corresponding to a user touch from the second segment and converting the second analog signals to respective second digital data that includes information identifying a current particular touched location on the second segment;
 where the first ADC and second ADC are coupled together, the first ADC providing to the second ADC a portion of the first digital data corresponding to a defined margin area of the first segment adjacent to the boundary between the first and second segments, and the second ADC providing to the first ADC a portion of the second digital data corresponding to a defined margin area of the second segment adjacent to the boundary between the second and second segments;
 where the information handling system further comprises at least one first programmable integrated circuit coupled to the first ADC and at least one second programmable integrated circuit coupled to the second ADC, the first ADC providing the first digital data combined with the provided portion of the second digital data to the at least one first programmable integrated circuit of the information handing system, and the second ADC providing the second digital data combined with the provided portion of the first digital data to the at least one second programmable integrated circuit of the information handling system; and
 where the information handling system further comprises at least one third programmable integrated circuit programmed to receive the first digital data that is combined with the provided portion of the second digital data and to receive the second digital data that is combined with the provided portion of the first digital data, and to form total combined digital data by combining the received first digital data that is combined with the provided portion of the second digital data with the received second digital data that is combined with the provided portion of the first digital data.

2. The information handling system of claim 1, where the defined margin area of the first segment has a first width and the defined margin area of the second segment has a second width; and where the at least one third programmable integrated circuit is programmed to dynamically change the first width and the second width in real time.

3. The information handling system of claim 1, where the defined margin area of the first segment has a first width and the defined margin area of the second segment has a second width; and where the at least one third programmable integrated circuit is programmed to monitor a current user mode of the information handling system, and to dynamically change the first width and the second width in real time based on a change in the detected current user mode of the information handling system.

4. The information handling system of claim 1, where:
 the at least one first programmable integrated circuit is a first microcontroller coupled to the first ADC and the at least one second programmable integrated circuit is a second microcontroller coupled to the second ADC, the first ADC providing the first digital data combined with the provided portion of the second digital data to the first microcontroller, and the second ADC providing the second digital data combined with the provided portion of the first digital data to the second microcontroller;
 where the at least one third programmable integrated circuit is a host programmable integrated circuit coupled to the first microcontroller and the second microcontroller, the host programmable integrated circuit receiving from the first microcontroller the first digital data that is combined with the provided portion of the second digital data, and the host programmable integrated circuit receiving from the second microcontroller the second digital data that is combined with the provided portion of the first digital data; and
 where the host programmable integrated circuit is programmed to analyze the total combined digital data to interpret one or more user touch gestures; and to take one or more display or application actions according to the interpretation of the user gestures.

5. The information handling system of claim 4, the first microcontroller providing the first digital data that is combined with the provided portion of the second digital data to the host programmable integrated circuit as first combined digital touch data that identifies the occurrence of a first user touch event and its corresponding sensed touch location; the second microcontroller providing the second digital data that is combined with the provided portion of the first digital data to the host programmable integrated circuit as second combined digital touch data that identifies the occurrence of a second user touch event and its corresponding sensed touch location; and where the host programmable integrated circuit is programmed to execute a human interface device (HID) touchscreen driver to analyze the total combined digital data to interpret one or more user touch gestures, and to take one or more display or application actions according to the interpretation of the user gestures.

6. The information handling system of claim 1, where the at least one first programmable integrated circuit is a first microcontroller coupled to the first ADC and the at least one second programmable integrated circuit is a second microcontroller coupled to the second ADC, the first ADC providing the first digital data combined with the provided portion of the second digital data to the first microcontroller, the second ADC providing the second digital data combined with the provided portion of the first digital data to the second microcontroller, and the second microcontroller providing to the first microcontroller the second digital data that is combined with the provided portion of the first digital data; where the at least one third programmable integrated circuit is a host programmable integrated circuit coupled to the first microcontroller, the host programmable integrated circuit receiving the first digital data that is combined with the provided portion of the second digital data from the first microcontroller, and the host programmable integrated circuit receiving the second digital data that is combined with the provided portion of the first digital data from the first microcontroller.

7. The information handling system of claim 6, the first microcontroller providing the first digital data that is combined with the provided portion of the second digital data to the host programmable integrated circuit as first combined digital touch data that identifies the occurrence of a first user touch event and its corresponding sensed touch location; and the first microcontroller providing the second digital data that is combined with the provided portion of the first digital data to the host programmable integrated circuit as second combined digital touch data that identifies the occurrence of a second user touch event and its corresponding sensed touch location.

8. The information handling system of claim 1, where the touch screen display device comprises a unitary layered planar display screen defining a continuous and unitary planar visual display area; and where the first and second segments are disposed in adjacent side-by-side relationship to each other, a plane of each of the first and second segments being disposed in stacked layered parallel relationship with a plane of a portion of the layered planar display screen; and where the touch screen is foldable about a hinged center line that is defined at a boundary between the first and second segments.

9. The information handling system of claim 1, where the information handling system further comprises a first touch controller comprising the first ADC, and a second touch controller comprising the second ADC; where the first segment comprises a first portion of receive lines of the touch screen display device, the first portion of receive lines forming sense nodes with transmit lines of the first touch controller and the first ADC receiving the first analog signals from the first portion of receive lines; and where the second segment comprises a second portion of receive lines of the touch screen display device that are separate from the first portion of receive lines, the second portion of receive lines forming sense nodes with transmit lines of the second touch controller.

10. The information handling system of claim 1, further comprising:
a first touch controller that comprises the first ADC, and a second touch controller that comprises the second ADC;
where the first segment comprises a first group of receive lines of the touch screen display device that form sense nodes with both a first group of transmit lines of the first touch controller and a first group of transmit lines of the second touch controller, the first ADC receiving the first analog signals from the first group of receive lines of the touch screen display device;
where the second segment comprises a second group of receive lines of the touch screen display device that form sense nodes with both a second group of transmit lines of the first touch controller and a second group of transmit lines of the second touch controller, the second ADC receiving the second analog signals from the second group of receive lines of the touch screen display device; and
where the first group of receive lines of the touch screen display device are different from the second group of receive lines of the touch screen display device, the first group of transmit lines of the first touch controller are different from the second group of transmit lines of the first touch controller, and the first group of transmit lines of the second touch controller are different from the second group of transmit lines of the second touch controller.

11. The information handling system of claim 1, where the at least one first programmable integrated circuit is a first microcontroller, the at least one second programmable circuit is a second microcontroller, and the at least one third programmable integrated circuit is a central processing unit (CPU).

12. A method, comprising:
displaying graphics images on a visual display area of a touch screen display device of an information handling system, the touch screen display device comprising at least first and second segments disposed in side-by-side relationship to each other with a boundary defined therebetween;
receiving in a first analog to digital converter (ADC) first analog signals corresponding to a user touch from a first segment of the touchscreen display device, and converting the first analog signals to respective first digital data that includes information identifying a current particular touched location on the first segment;
receiving in a second ADC second analog signals corresponding to a user touch from a second segment of the touchscreen display device, and converting the second analog signals to respective second digital data that includes information identifying a current particular touched location on the second segment, the first and second segments of the touchscreen display device being disposed in side-by-side relationship to each other with a boundary defined therebetween;
providing from the first ADC to the second ADC a portion of the first digital data corresponding to a defined margin area of the first segment adjacent to the boundary between the first and second segments, and providing from the second ADC to the first ADC a portion of the second digital data corresponding to a defined margin area of the second segment adjacent to the boundary between the first and second segments;

in the first ADC combining the first digital data with the provided portion of the second digital data, and in the second ADC combining the second digital data with the provided portion of the first digital data; and combining the first digital data that is combined with the provided portion of the second digital data with the second digital data that is combined with the provided portion of the first digital data to form total combined digital data.

13. The method of claim 12, where the defined margin area of the first segment has a first width and the defined margin area of the second segment has a second width; and where the method further comprises dynamically changing the first width and the second width in real time.

14. The method of claim 12, where the defined margin area of the first segment has a first width and the defined margin area of the second segment has a second width; and where the method further comprises monitoring a current user mode of the information handling system, and dynamically changing the first width and the second width in real time based on a change in the detected current user mode of the information handling system.

15. The method of claim 12, further comprising analyzing the total combined digital data to interpret one or more user touch gestures; and taking one or more display or application actions according to the interpretation of the user gestures.

16. The method of claim 15, further comprising providing the first digital data that is combined with the provided portion of the second digital data as first combined digital touch data that identifies the occurrence of a first user touch event and its corresponding sensed touch location; providing the second digital data that is combined with the provided portion of the first digital data as second combined digital touch data that identifies the occurrence of a second user touch event and its corresponding sensed touch location; and using a human interface device (HID) touchscreen driver to analyze the total combined digital data to interpret the one or more user touch gestures.

17. The method of claim 12, further comprising providing the first digital data combined with the provided portion of the second digital data from the first ADC to a first microcontroller; providing the second digital data combined with the provided portion of the first digital data from the second ADC to a second microcontroller; providing from the second microcontroller to the first microcontroller the second digital data that is combined with the provided portion of the first digital data; receiving in a host programmable integrated circuit from the first microcontroller the first digital data that is combined with the provided portion of the second digital data; and receiving in the host programmable integrated circuit from the first microcontroller the second digital data that is combined with the provided portion of the first digital data.

18. The method of claim 17, providing the first digital data that is combined with the provided portion of the second digital data from the first microcontroller to the host programmable integrated circuit as first combined digital touch data that identifies the occurrence of a first user touch event and its corresponding sensed touch location; and providing the second digital data that is combined with the provided portion of the first digital data from the first microcontroller to the host programmable integrated circuit as second combined digital touch data that identifies the occurrence of a second user touch event and its corresponding sensed touch location.

19. The method of claim 12, where the touch screen display device comprises a unitary layered planar display screen defining a continuous and unitary planar visual display area; and where the first and second segments are disposed in adjacent side-by-side relationship to each other, a plane of each of the first and second segments being disposed in stacked layered parallel relationship with a plane of a portion of the layered planar display screen; and where the touch screen is foldable about a hinged center line that is defined at a boundary between the first and second segments.

20. The method of claim 12, where the information handling system further comprises a first touch controller comprising the first ADC, and a second touch controller comprising the second ADC; where the first segment comprises a first portion of receive lines of the touch screen display device, the first portion of receive lines forming sense nodes with transmit lines of the first touch controller and the first ADC receiving the first analog signals from the first portion of receive lines; and where the second segment comprises a second portion of receive lines of the touch screen display device that are separate from the first portion of receive lines, the second portion of receive lines forming sense nodes with transmit lines of the second touch controller.

21. The method of claim 12, further comprising:
a first touch controller that comprises the first ADC, and a second touch controller that comprises the second ADC;
where the first segment comprises a first group of receive lines of the touch screen display device that form sense nodes with both a first group of transmit lines of the first touch controller and a first group of transmit lines of the second touch controller, the first ADC receiving the first analog signals from the first group of receive lines of the touch screen display device;
where the second segment comprises a second group of receive lines of the touch screen display device that form sense nodes with both a second group of transmit lines of the first touch controller and a second group of transmit lines of the second touch controller, the second ADC receiving the second analog signals from the second group of receive lines of the touch screen display device; and
where the first group of receive lines of the touch screen display device are different from the second group of receive lines of the touch screen display device, the first group of transmit lines of the first touch controller are different from the second group of transmit lines of the first touch controller, and the first group of transmit lines of the second touch controller are different from the second group of transmit lines of the second touch controller.

\* \* \* \* \*